US011884462B2

(12) United States Patent
Davis et al.

(10) Patent No.: US 11,884,462 B2
(45) Date of Patent: Jan. 30, 2024

(54) TRAY

(71) Applicant: Multi Packaging Solutions UK Limited, Nottingham (GB)

(72) Inventors: Nigel Davis, Nottingham (GB); Kevin Topfer, Nottingham (GB); David Yates, Nottingham (GB)

(73) Assignee: Multi Packaging Solutions UK Limited, Nottingham (GB)

( * ) Notice: Subject to any disclaimer, the term of this patent is extended or adjusted under 35 U.S.C. 154(b) by 468 days.

(21) Appl. No.: 17/104,046

(22) Filed: Nov. 25, 2020

(65) Prior Publication Data

US 2021/0155369 A1 May 27, 2021

(30) Foreign Application Priority Data

Nov. 25, 2019 (GB) ..................................... 1917122

(51) Int. Cl.

*B65D 5/50* (2006.01)
*B31B 50/62* (2017.01)
*B31B 50/59* (2017.01)
*B31B 110/35* (2017.01)
*B31B 120/20* (2017.01)

(52) U.S. Cl.

CPC ............ *B65D 5/503* (2013.01); *B31B 50/592* (2018.05); *B31B 50/624* (2017.08); *B31B 2110/35* (2017.08); *B31B 2120/20* (2017.08)

(58) Field of Classification Search

CPC .. B65D 5/503; B65D 5/4802; B65D 5/48022; B65D 5/5038; B65D 75/366; B65D 75/522; B31B 2110/35; B31B 2120/20

USPC ................................ 206/562, 564, 722, 725

See application file for complete search history.

(56) References Cited

U.S. PATENT DOCUMENTS

| | | | | | |
|---|---|---|---|---|---|
| 1,631,080 | A | * | 5/1927 | Baker | B65D 5/5038 211/10 |
| 2,483,583 | A | * | 10/1949 | Holes | B65D 5/48 229/120.14 |
| 3,209,980 | A | * | 10/1965 | Festa | B65D 71/72 206/521.1 |
| 3,595,382 | A | | 7/1971 | Hofer | |
| 4,469,271 | A | * | 9/1984 | Kulig | B65D 71/72 206/813 |

(Continued)

FOREIGN PATENT DOCUMENTS

| | | | |
|---|---|---|---|
| CN | 207090068 | U | 3/2018 |
| DE | 9102785 | U | 5/1991 |

(Continued)

OTHER PUBLICATIONS

UK Search Report dated Apr. 15, 2020, Application No. GB1917122.2.

(Continued)

*Primary Examiner* — Luan K Bui

(74) *Attorney, Agent, or Firm* — Young Basile Hanlon & MacFarlane, P.C.

(57) ABSTRACT

A tray made of cardboard, paperboard or other lightweight foldable sheet material that comprises one or more pockets (8) for receiving product. The tray comprises a top sheet defining one or more top sheet openings for the one or more pockets and a bottom sheet attached to the top sheet that comprises one or more bottom sheet openings that are aligned with the top sheet openings.

18 Claims, 9 Drawing Sheets

(56) References Cited

U.S. PATENT DOCUMENTS

| | | | | |
|---|---|---|---|---|
| 5,407,076 | A | 4/1995 | Sabet | |
| 6,474,473 | B2 | 11/2002 | Wong | |
| 8,925,723 | B2 * | 1/2015 | Folchini | B65D 5/5007 206/370 |
| 2004/0000500 | A1 | 1/2004 | Hsu | |
| 2008/0073418 | A1 | 3/2008 | Hsu | |
| 2018/0290787 | A1 * | 10/2018 | McDonald | B65D 5/503 |
| 2020/0223580 | A1 | 7/2020 | Topfer | |
| 2020/0223610 | A1 * | 7/2020 | Topfer | B65D 75/522 |

FOREIGN PATENT DOCUMENTS

| | | | |
|---|---|---|---|
| DE | 29803952 | U1 | 7/1999 |
| EP | 0103535 | A2 | 3/1984 |
| EP | 0441102 | A | 8/1991 |
| EP | 0441102 | A1 | 8/1991 |
| EP | 2902410 | A1 | 12/2007 |
| EP | 2594506 | A1 | 5/2013 |
| EP | 2610194 | A1 | 7/2013 |
| EP | 2746186 | A1 | 6/2014 |
| FR | 72561 | E | 4/1960 |
| FR | 1478568 | A | 4/1967 |
| FR | 1490713 | A | 8/1967 |
| FR | 2129295 | A5 | 10/1972 |
| FR | 2902410 | A1 | 12/2007 |
| GB | 2127785 | A | 4/1984 |
| JP | 2011042372 | A | 3/2011 |
| WO | 03/042070 | A | 5/2003 |

OTHER PUBLICATIONS

UK Search Report dated Jul. 1, 2019, Application No. GB1900566.9.

UK Search Report dated Jun. 27, 2019, Application No. GB1900565.1.

Extended European Search Report dated Apr. 8, 2020, Application No. 20151797.6.

Extended European Search Report dated Apr. 30, 2020, Application No. 20151790.1.

Extended European Search Report dated May 11, 2021, Application No. 20209929.7.

* cited by examiner

TRAY

TECHNICAL FIELD

The present invention relates to a tray for a product, made of cardboard, paperboard or other lightweight foldable sheet material. The invention also extends to a blank for such a tray, and a method of erecting the blank. The tray may locate one or more products in a desired position relative to an outer package, or may itself form part of a package, such as a blister pack.

BACKGROUND

It is often necessary to be able to locate certain products in a desired position within a package. For example, this may be particularly important where multiple products are located within a single package e.g. a multi-pack. It may be necessary to locate product(s) within the package so as to enable them to be viewable by a user from the exterior of the package e.g. such that they are aligned with window(s) or apertures in the package. Various types of product may be presented in this manner, including, but not limited to, food item(s), such as confectionary, or cosmetic products. One example of such a package would be a seasonal selection pack.

Considerable difficulties may be involved in ensuring that product(s) remain aligned relative to the package after assembly within the package throughout shipping and until the product(s) are ultimately removed from the package by a user.

Previously, products have been located in a desired position within a package using a moulded plastic insert. However, for environmental reasons, there is a growing need to provide packaging which is more easily recyclable, and which may avoid the use of plastic. In other arrangements, products have been located within a package using locating means formed of cardboard or paperboard, and integral with the outer package. Such means may automatically erect itself when the outer package is erected, or may require manual erection. The product is then loaded into the locating means with the locating means already within the outer package. It has been recognised that such arrangements are not suitable for high speed, high volume machine erection, or for a product range of varying size within one consolidated package Moreover, many products are displayed in plastic blister packs. The blister pack includes a moulded plastic pod for receiving the product and a foil closure. However, such packages are becoming environmentally less popular.

SUMMARY OF THE INVENTION

From a first aspect, the invention provides a tray made of cardboard, paperboard or other lightweight foldable sheet material and comprising one or more pockets for receiving product. The tray comprises a top sheet defining one or more top sheet openings for the one or more pockets and a bottom sheet attached to the top sheet and comprising one or more bottom sheet openings aligned with the top sheet openings. The top sheet comprises one or more respective sets of top sheet flaps which each comprise a top sheet flap proximal panel hingedly connected to the top sheet about a respective top sheet flap proximal hinge line defined at the respective top sheet opening. At least one of the top sheet flaps further comprises a top sheet flap distal panel hingedly attached to the respective top sheet flap proximal panel about a respective top sheet flap distal fold line. Each top sheet flap is folded about the respective top sheet flap proximal hinge line to extend through the bottom sheet opening such that the top sheet flap proximal panel thereof defines, at least in part, a side wall of the pocket. The bottom sheet comprises one or more respective sets of bottom sheet flaps. At least one bottom sheet flap comprises a bottom sheet flap proximal portion hingedly attached to the bottom sheet about a respective bottom sheet flap proximal hinge line defined at the respective bottom sheet opening and a bottom sheet flap distal panel hingedly attached to the bottom sheet flap proximal panel about a respective bottom sheet flap distal fold line. The bottom sheet flap is folded about the respective bottom flap proximal hinge line such that the bottom sheet flap proximal panel defines at least in part a pocket side wall, and the bottom sheet flap distal panel defines at least in part a base wall of the pocket. Within each pocket, at least one top sheet flap distal panel is adhesively secured to the bottom sheet flap distal panel.

The tray may comprise a plurality of pockets. In certain embodiments, the respective pockets may have different depths from one another.

The top sheet and bottom sheet may each comprise a peripheral flange. The top sheet and the bottom sheet may be bonded to each other at the peripheral flanges.

The top sheet and bottom sheet may each comprise respective webs of material formed between adjacent pockets. One or more of the webs of material of the top sheet may be bonded to one or more of the webs of the bottom sheet.

In certain embodiments, the proximal panels of the flaps of the respective sets of flaps may be angled so as to define a tapering pocket.

In various embodiments, the bottom sheet may comprise a single bottom sheet flap per set of bottom sheet flaps.

In other embodiments, the bottom sheet may comprise a plurality of bottom sheet flaps per set of bottom sheet flaps. In certain embodiments, a plurality of bottom sheet flaps may be provided on one side of the respective bottom sheet opening.

In various embodiments, each top sheet flap of the respective set of top sheet flaps may comprise a top sheet flap distal panel. Some or each of the top sheet flap distal panels may be bonded to a bottom sheet flap distal panel.

In other embodiments, at least one top sheet flap of the respective set of top sheet flaps does not comprise a top sheet flap distal panel.

In various embodiments a single top sheet flap may be provided on a respective side of the top sheet opening.

In various embodiments, top sheet flaps may be provided on opposed sides of the top sheet opening.

In certain embodiments, a plurality of bottom sheet flaps may be provided on the bottom sheet.

In various embodiments, the top sheet and bottom sheet may comprise aligned location openings.

From a further aspect, the invention provides a tray made of cardboard, paperboard or other lightweight foldable sheet material and comprising a plurality of pockets for receiving products, the tray comprising a top sheet and a bottom sheet bonded together to define the pockets, and wherein the pockets comprise pockets of different depths.

In this aspect the pockets may be defined by respective flaps of the top and bottom sheets which are bonded together.

The flaps may be configured in the manner as set forth in the various paragraphs above.

The invention also provides a method of manufacturing a tray in accordance with the invention in any of its aspects or embodiments. The method comprises placing a bottom sheet on a female forming tool comprising one or more cavities; moving a bottom sheet male forming tool into the female forming tool so as to fold the bottom sheet flaps into the one or more cavities; withdrawing the bottom sheet male forming tool from the female forming tool; placing a top sheet over the folded bottom sheet in alignment therewith;

moving a top sheet male forming tool into the female forming tool so as to fold the top sheet flaps into the one or more cavities and to press the top sheet against the bottom sheet so as to bond the top sheet to the bottom sheet; withdrawing the top sheet male forming tool from the female forming tool, and removing the tray from the female forming tool.

The method may further comprise applying adhesive to selected areas of the bottom sheet or of the top sheet prior to bringing the top sheet and bottom sheet into engagement.

The method may comprise applying adhesive to selected areas of the folded bottom sheet prior to bringing the top sheet into engagement with the bottom sheet.

BRIEF DESCRIPTION OF THE DRAWINGS

Some embodiments of the invention will now be described, by way of example only, with reference to the accompanying drawings in which.

DETAILED DESCRIPTION

Figure 1:
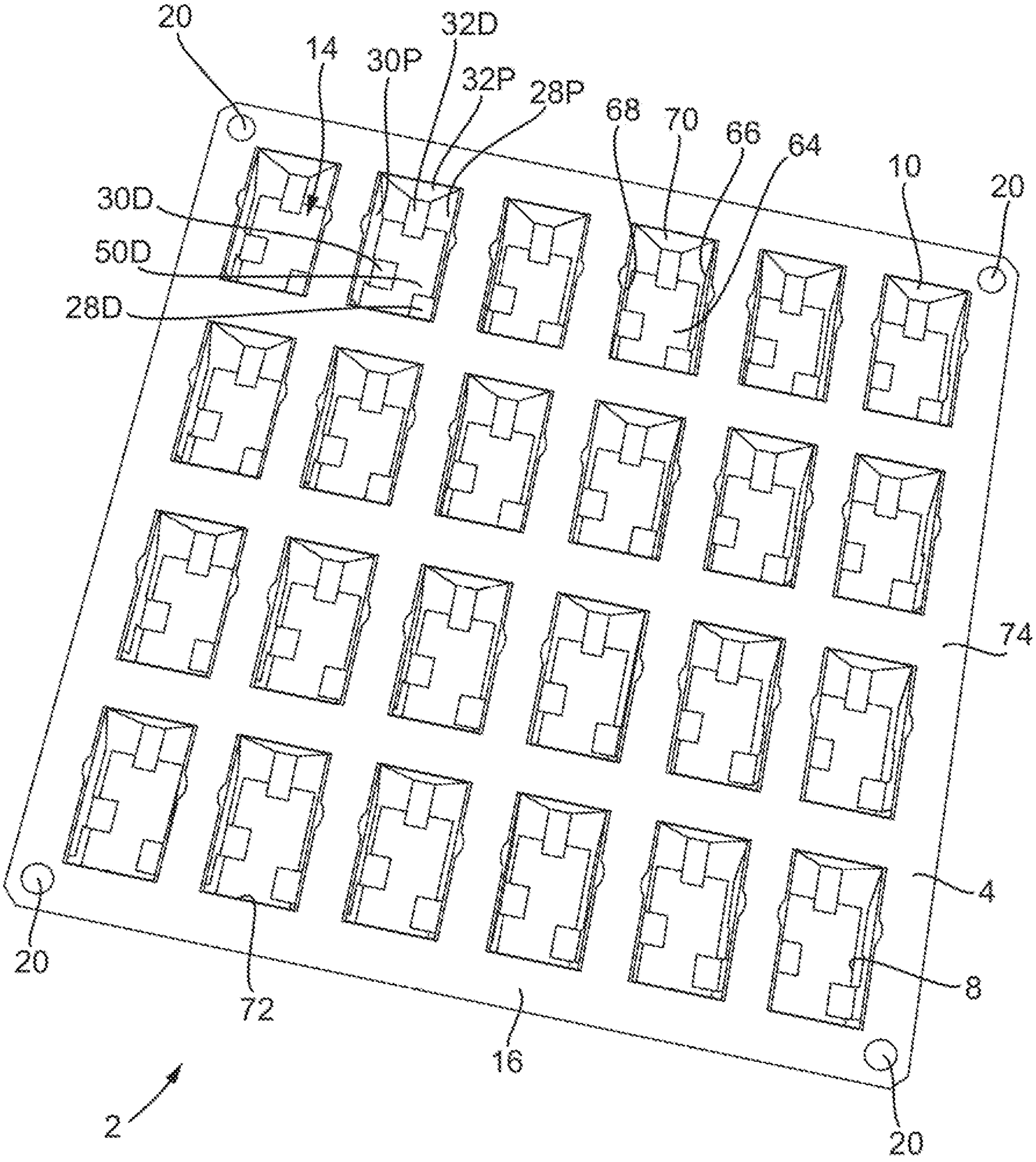
FIG. 1 shows a top perspective view of a first tray in accordance with the invention.

With reference to FIGS. 1 to 6, a first embodiment of tray 2 in accordance with the invention is illustrated.

The tray 2 comprises a top sheet 4 and a bottom sheet 6 and defines a plurality of pockets 8 for receiving a product. In this embodiment, the pockets 8 are arranged in an array of four rows of six pockets 8, but other arrays of pockets 8 are clearly possible. The pockets 8 are all of the same shape and depth in this embodiment, but as will be described in relation to the second embodiment of the invention, they may be of different shapes and depths from one another.

The top sheet 4 and the bottom sheet 6 are made from cardboard, paperboard or other lightweight foldable sheet material. The top sheet 4 comprises a plurality of top sheet openings 10. The bottom sheet 6 comprises a plurality of bottom sheet openings 12 which are aligned with the top sheet openings 10. The top sheet openings 10 and bottom sheet openings 12 together form a plurality of pocket openings 13. The top sheet openings 10 and bottom sheet openings 12 are the same size in this embodiment.

In this embodiment, the top sheet 4 and bottom sheet 6 are both rectangular, for example square, in shape. The top sheet 4 is provided with a top sheet peripheral flange 14 which extends around the array of top sheet openings 10. The bottom sheet 6 is also provided with a bottom peripheral flange 16 which extends around the array of bottom sheet openings 12. Locating holes 18 may be provided in the respective flanges 14, 16 to allow for proper alignment of the top sheet 4 and bottom sheet 6 during assembly. In this embodiment, locating holes 18 are provided in the respective corners of the top sheet 4 and bottom sheet 6. However, other configurations are possible.

The top sheet openings 10 are separated by top sheet webs 22. The bottom sheet openings 12 are separated by bottom sheet webs 24. In the described embodiment, the top sheet openings 10 and bottom sheet openings 12 are of the same size and shape such that the top sheet webs 22 and bottom sheet webs 24 are also of the same shape and size. As will be described further below, the top sheet 4 and bottom sheet 6 may be bonded together at the peripheral flanges 16, 18 and/or at least some of the webs 22, 24.

The top sheet 4 comprises a plurality of arrays 26 of top sheet flaps arranged around the respective top sheet openings 10. In this embodiment, three top sheet flaps 28, 30, 32 are arranged around each top sheet opening 10. Each top sheet flap 28, 30, 32 in this embodiment comprises a proximal top sheet flap panel 28P, 30P, 32P and a distal top sheet flap panel 28D, 30D, 32D. In this embodiment, one side 34 of the top sheet opening 10 does not have a flap. The proximal top sheet flap panels 28P, 30P, 32P are hingedly connected to the top sheet 4 at their respective proximal ends about respective top sheet flap proximal fold lines 36, 38, 40. The top sheet flap fold lines 36, 38, 40 may be defined by partial depth or full depth cuts through the top sheet 4 in some embodiments.

The distal top sheet flap panels 28D, 30D, 32D are hingedly connected to the proximal top sheet flap panels 28D, 30D, 32D about a respective top sheet flap distal fold lines 42, 44, 46. The top sheet flap distal fold lines 42, 44, 46 may be defined by partial depth or full depth cuts through the top sheet 4 in some embodiments or simply as simple fold lines.

The bottom sheet 6 comprises a bottom sheet flap 50. In this embodiment, a single bottom sheet flap 50 is arranged at each bottom sheet opening 12, although in other embodiments, more than one bottom sheet 50 flap may be provided. As can be seen from the Figures, the bottom sheet flap 50 is arranged at a side 52 of the bottom sheet opening 12 adjacent the side 34 of the top sheet opening 12 which does not have a top sheet flap.

The bottom sheet flap 50 comprises a proximal bottom sheet flap panel 50P and a distal bottom sheet flap panel 50D. The proximal bottom sheet flap panel 50P is hingedly connected to the bottom sheet 6 about a bottom sheet flap proximal fold line 58. The bottom sheet flap proximal fold line 58 may be defined by a partial depth or full depth cut through the bottom sheet 6 in some embodiments.

The distal bottom sheet flap panel 50D is hingedly attached to the proximal bottom sheet flap panel 50P about a bottom sheet flap distal fold line 62. The bottom sheet flap distal fold line 62 may be defined by partial depth or full depth cuts or crease through the bottom sheet 6 in some embodiments.

In this embodiment, the distal bottom sheet flap panel 50D is substantially longer than the proximal bottom sheet flap panel 50P as it will, as will be described further below, form a substantial portion of the bottom 64 of the respective pocket 8.

Figure 2:
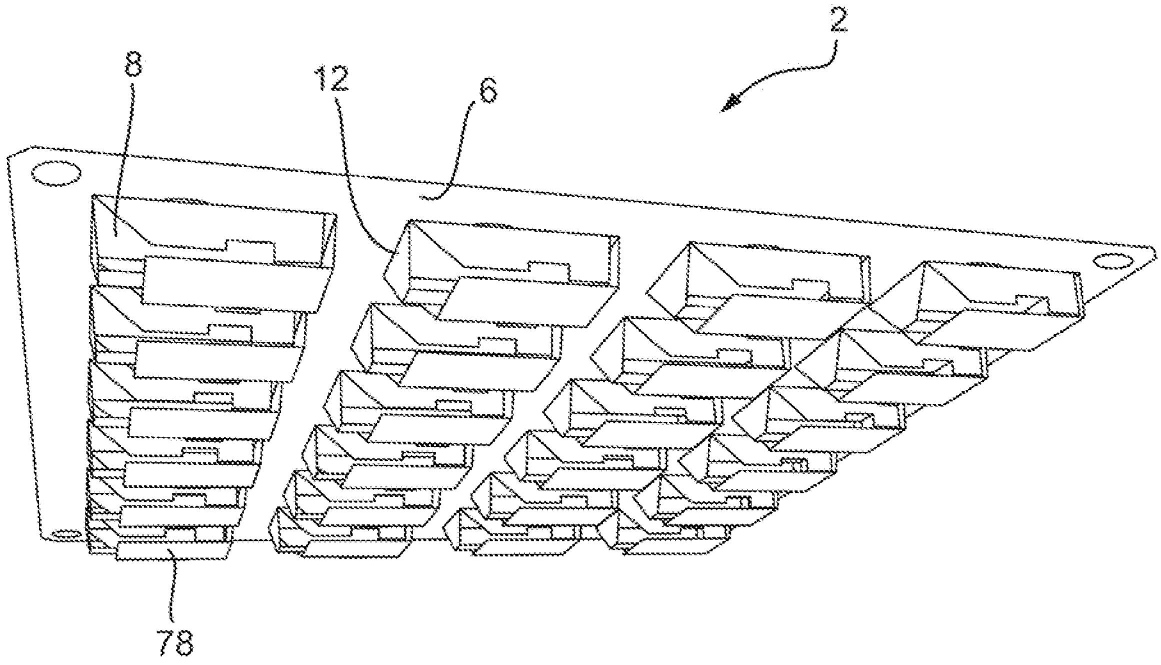
FIG. 2 shows a side perspective view of the tray of FIG. 1.
Figure 3:
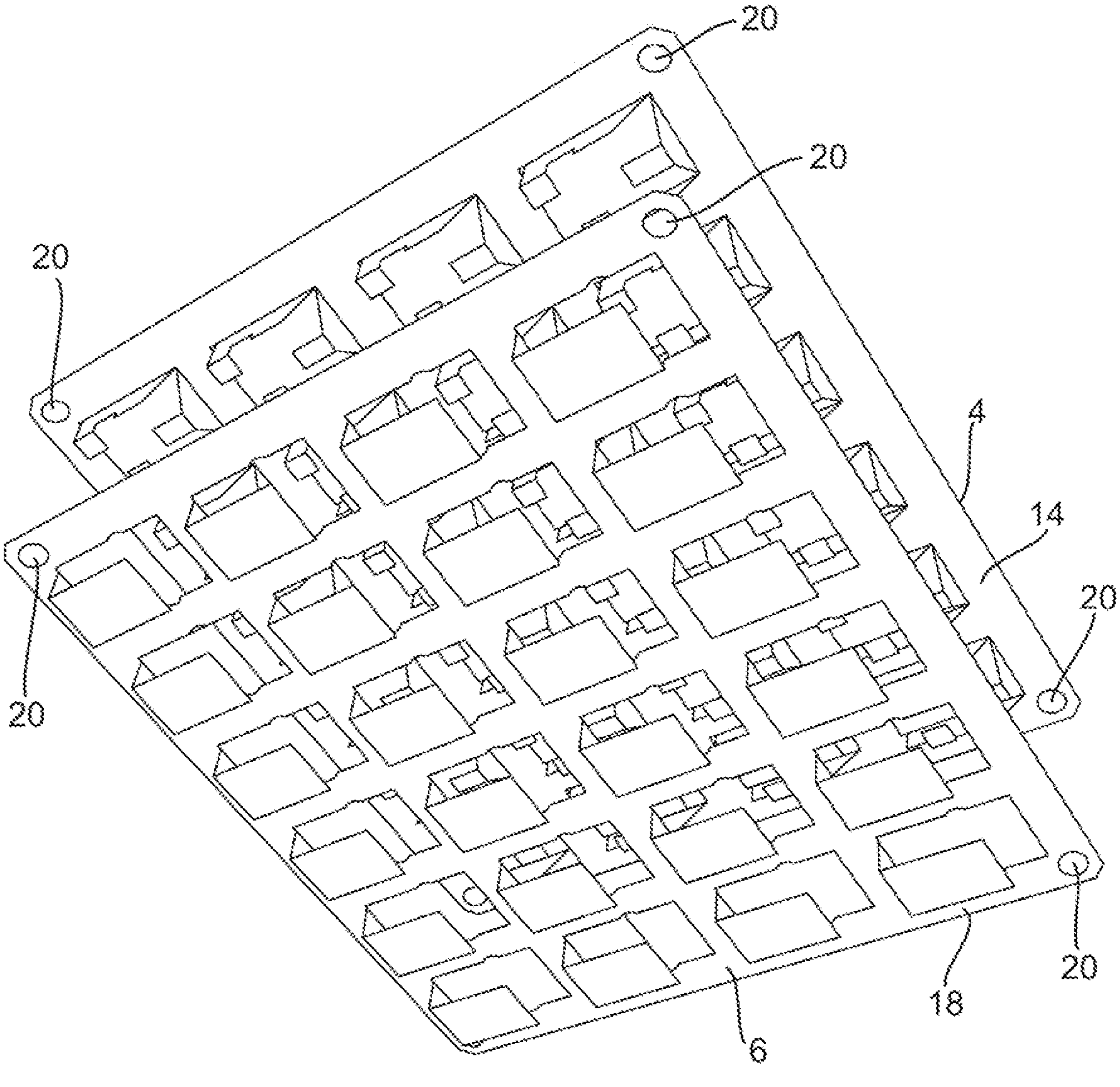
FIG. 3 shows an exploded perspective view of the tray of FIG. 1.
Figure 4:
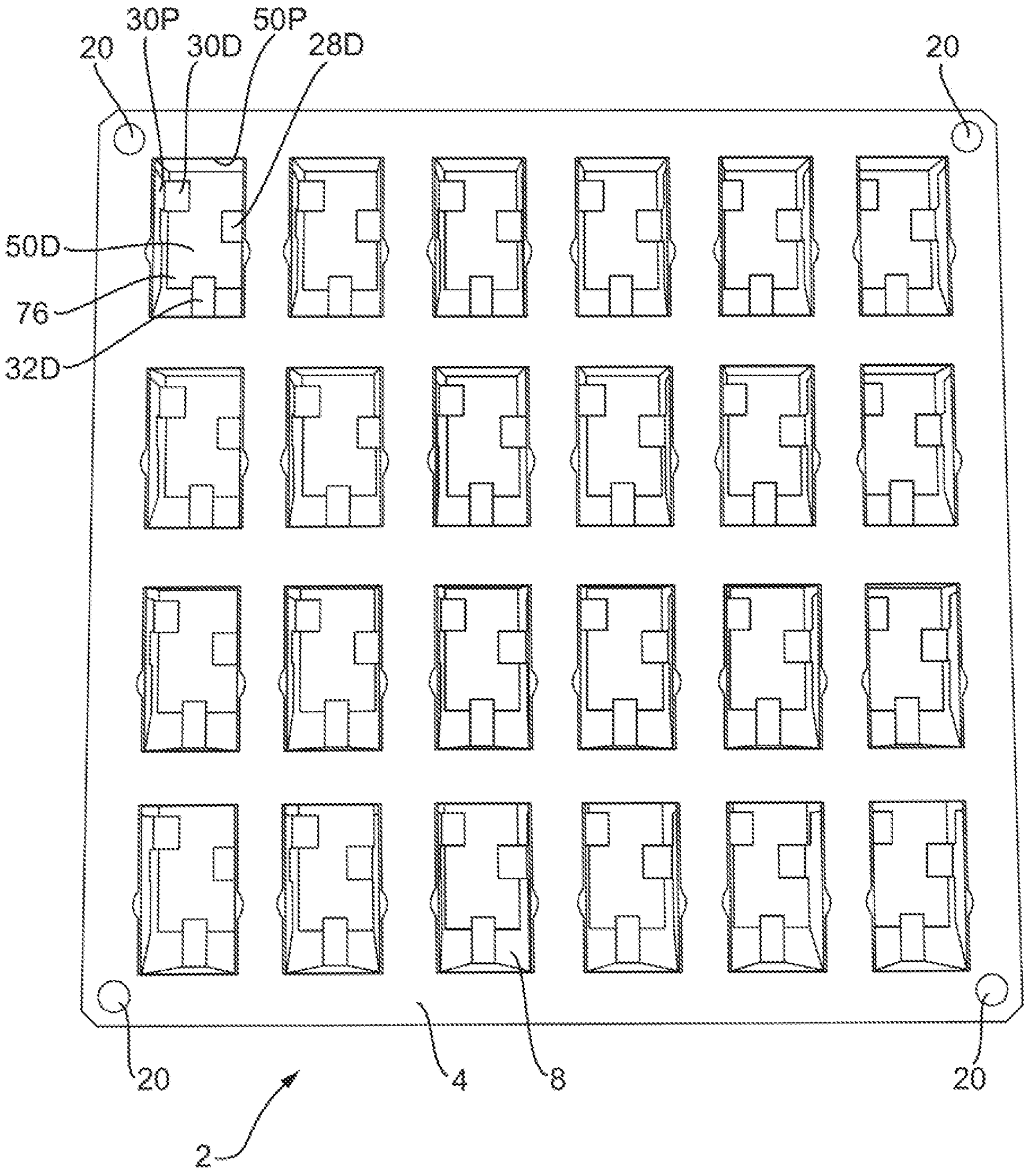
FIG. 4 shows a plan view of the tray of FIG. 1.
Figure 5:
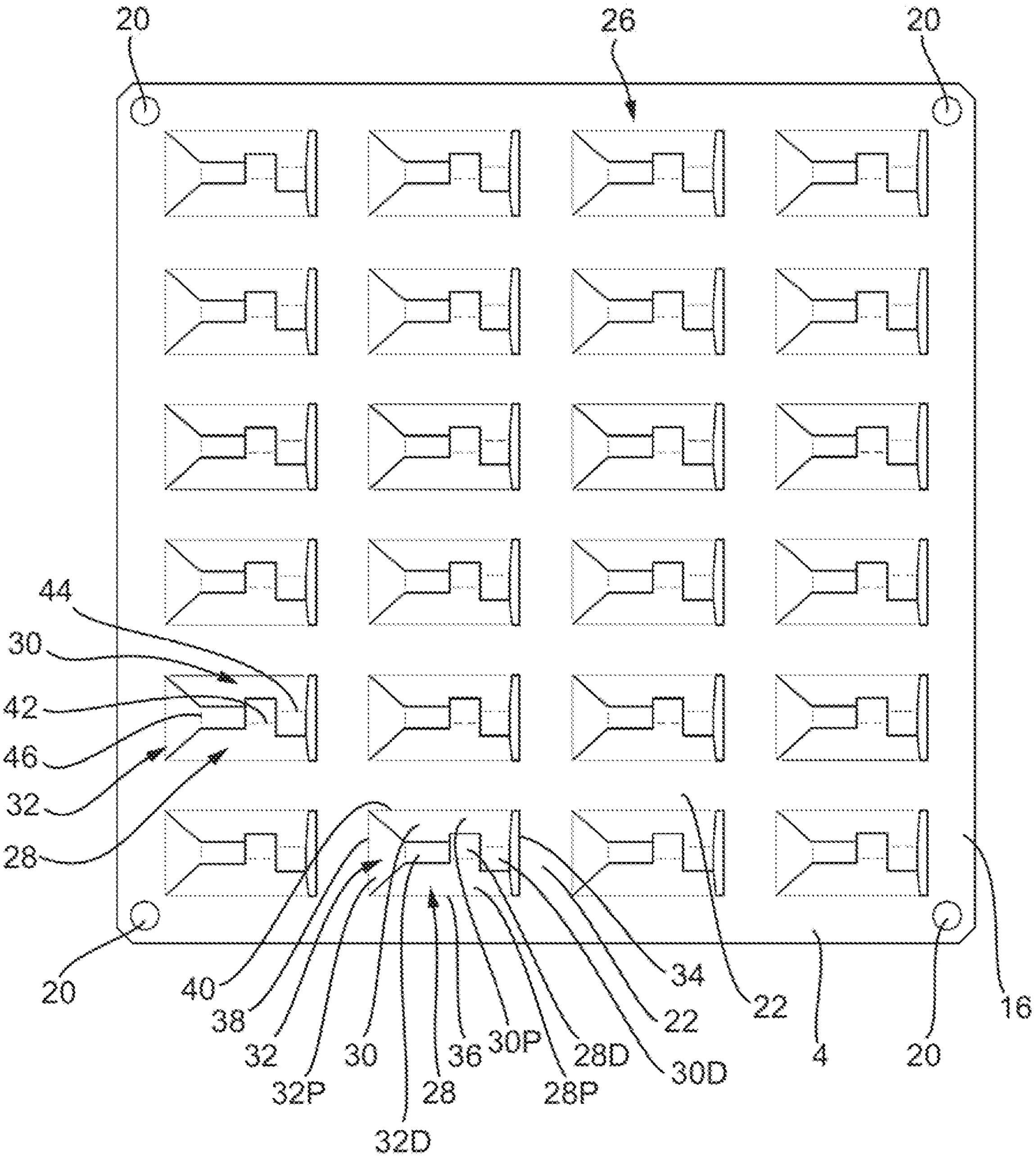
FIG. 5 shows a plan view of the blank of the top sheet of the tray of FIG. 1.
Figure 6:
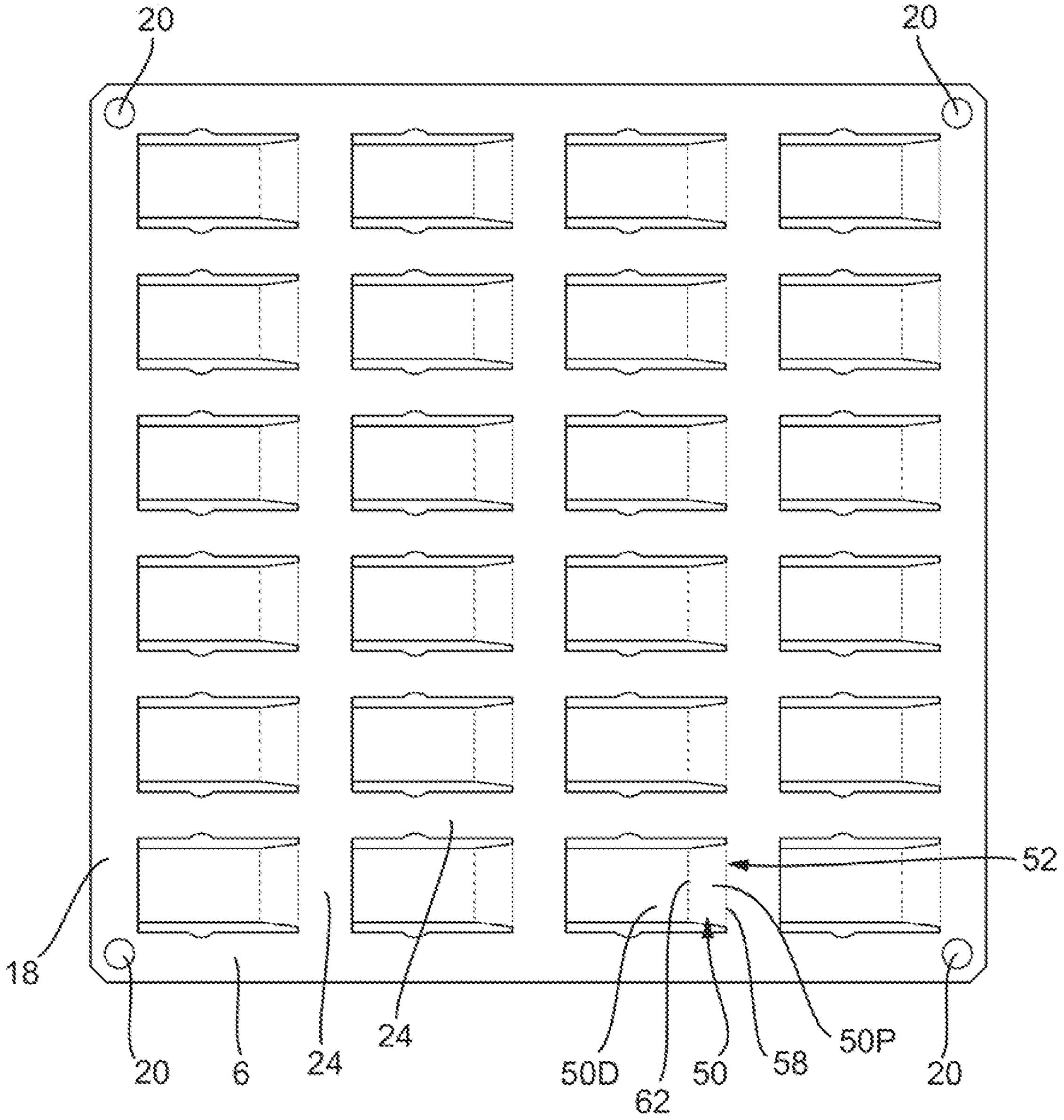
FIG. 6 shows a plan view of the blank of the bottom sheet of the tray of FIG. 1.

As can be seen from FIGS. 1 to 3, the top sheet 4 and bottom sheet 6 are placed in registry. As discussed above, the top sheet 4 and bottom sheet 6 may be bonded together at their peripheral flanges 14, 16 and/or their webs 22, 24. The top sheet flaps 28, 30, 32 are folded inwardly about the top sheet flap proximal fold lines 36, 38, 40 so as to extend through the associated bottom sheet openings 12. The top sheet flap proximal panels 28P, 30P, 32P form three side walls 66, 68, 70 of the respective pocket 8. The top sheet flaps proximal panels 28P, 30P, 32P are preferably folded inwardly by less than 90 degrees such that the pocket 8 tapers from the top sheet 4 towards the bottom 64 of the pocket 8. This is advantageous in that it allows the trays to be stacked in a nested configuration.

The bottom sheet flap 50 is folded inwardly about the bottom sheet flap proximal fold line 58 such that its proximal panel 50P forms the remaining side wall 72 of the pocket 8. Again the bottom sheet proximal flap 50P is preferably folded by less than 90 degrees such that the pocket 8 tapers, as discussed above.

The distal bottom sheet flap panel 50D is folded about the bottom sheet flap distal fold line 62 so as to lie generally parallel to plane of the upper surface 74 of the top sheet 4. The top sheet flap distal panels 28D, 30D, 32D are also folded about the respective top sheet flap distal fold lines 42, 44, 46 to lie generally parallel to plane of the upper surface 74 of the top sheet 4 and are bonded to the bottom sheet flap distal panel 50D, in this embodiment to the upper surface 76 thereof (although they may be bonded to the lower surface 78 of the bottom sheet flap distal panel 50D in other embodiments) in order to form the pockets 8.

Figure 7:
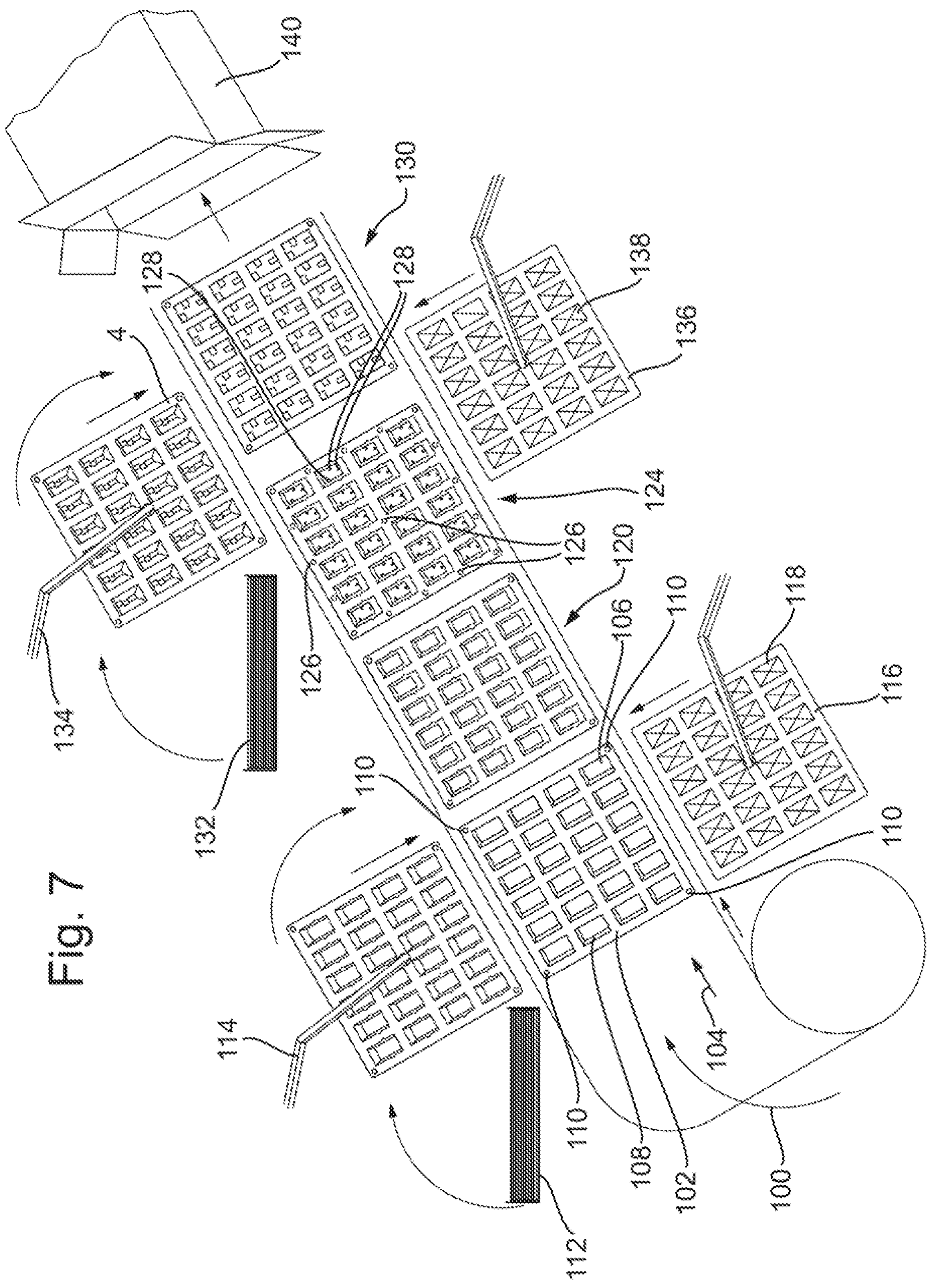
FIG. 7 illustrates schematically the sequence of assembly of the tray of FIG. 1.

FIG. 7 illustrates schematically a method for assembling the top sheet 4 and bottom sheet 6 to form the tray 2.

In FIG. 7, a belt 100 comprises a series of female forming tools 102, the belt being movable in a direction 104. Each female forming tool 102 comprises an array of pocket forming cavities 106 corresponding to the arrays of top sheet openings 10 and bottom sheet openings 12 of the top sheet 4 and bottom sheet 6. The walls 108 of each pocket forming cavity 106 taper inwardly to provide the appropriate taper of the pockets 8 in the finished tray 2. The female forming tool 102 further comprises a plurality of locating pins 110.

As a first step in the process, a bottom sheet 6 is placed onto the female forming tool 102. The bottom sheet 6 may be picked from a stack 112 of bottom sheets 6 by a pick and place feeder 114. The locating holes 20 of the bottom sheet 6 are received over the locating pins 110 of the female forming tool 102 so as properly to locate the bottom sheet 6 on the female forming tool 102. Of course, locating holes 20 are not essential and appropriate alignment of the top sheet 4 and bottom sheet 6 could be achieved by the assembly apparatus or by other means.

A male bottom sheet forming tool 116 is then brought into registry with the female forming tool 102. The male bottom sheet forming tool 116 is formed with projecting formations 118 which are received in the pocket forming cavities 106. The male bottom sheet forming tool 116 is pressed down on top of the positioned bottom sheet 6 and moved into the female forming tool 102. The projecting formations 118 of the male bottom sheet forming tool 16 are shaped so as to fold the proximal bottom sheet flap panel 50P and the distal bottom sheet flap panel 50D about their respective fold lines 58, 62 into their desired folded configuration as the male bottom sheet forming tool 116 moves into the pocket forming cavities 106. The male bottom sheet forming tool 116 is then withdrawn from the female forming tool 102 which is then, with the folded bottom sheet 6 still retained therein, moved along on the belt 100. This is shown schematically at station 120 in FIG. 7.

Adhesive may then be applied to the bottom sheet 6 at an adhesive applying station 124, as shown schematically in FIG. 7. In this embodiment, spots 126 of adhesive are shown as being applied to the peripheral flange 16 and a central web 24 of the bottom sheet 6. Adhesive may be applied to the peripheral flange 16 and the webs 24 of the bottom sheet in whatever quantity and pattern as necessary to ensure satisfactory bonding between the top sheet 4 and bottom sheet 6.

In addition, adhesive is also applied to the bottom sheet flap distal panels 50D. In the illustrated embodiment, three spots 128 of adhesive may be applied to each bottom sheet flap distal panel 50D. Adhesive may be applied to the bottom sheet flap distal panels 50D in whatever quantity and pattern as necessary to ensure satisfactory bonding between the top sheet flap distal panels 28D, 30D, 32D and the bottom sheet flap distal panels 50D.

While adhesive has been shown as being applied in spots, it may be applied in a continuous line or as a film, or in any convenient manner.

After adhesive has been applied to the bottom sheet 6, the top sheet 4 may be joined to the bottom sheet 4 at a joining station 130. The glued bottom sheet 6 still in female forming tool 102 is moved to the joining station on the belt 100 and a top sheet 4 brought into registry with the bottom sheet 6 by means of the location holes 20 of the top sheet being located over the locating pins 110 of the female forming tool 102. The top sheet 4 may be picked from a stack 132 of top sheet blanks by means of a pick and place feeder 134.

In an alternative arrangement, adhesive may instead or additionally be applied to the top sheet 6 whilst still flat.

A male top sheet forming tool 136 is then brought into registry with the female forming tool 102. The male top sheet forming tool 136 is formed with projecting formations 138 which are received in the pocket forming cavities 106. The male top sheet forming tool 116 is pressed down on top of positioned top sheet 4 and moved into the female forming tool 102. The projecting formations 138 of the male top sheet forming tool 16 are shaped so as to fold the top sheet flap 28, 30, 32 about their respective fold lines into their desired folded configuration as the male top sheet forming tool 136 moves into the pocket forming cavities 106.

The male top sheet forming tool 136 will press the top sheet peripheral flange 14 and top sheet webs 22 into contact with the bottom sheet peripheral flange 16 and bottom sheet webs 24, thereby bonding the top sheet 4 and bottom sheet 6 together. The male top sheet forming tool 136 will also press the folded top sheet flap distal panels 28D, 30D, 32D into contact with the bottom sheet flap distal panel 50D, thereby bonding these together.

The male top sheet forming tool 136 is then withdrawn from the female forming tool 102 and the bonded tray 2 then ejected from the female forming tool 102. The tray 2 may then be loaded with product and then packed into a container 140.

Of course, this is just one possible system for forming the tray 2 and other systems may be used.

Modifications may be made to the tray illustrated in FIGS. 1 to 7 without departing from the scope of the invention.

For example, not all the pockets 8 may be of the same size or depth. Also, while all the top sheet flap distal panels 28D, 30D, 32D are attached to the bottom sheet flap distal panel 50D that is not essential. One or more of the top sheet flaps 28, 30, 32 may not, for example, be provided with a top sheet flap distal panel 28D, 30D, 32D at all. Although this may not provide a fixed wall for the pocket 8, the unattached flap proximal panel 28P, 30P, 32P may still provide some useful function in at least partially supporting a product in the pocket 8.

Preferably, top sheet flaps 28, 30 are provided on a pair of opposed sides of the pocket opening 13 and attached to the bottom sheet flap 50. This provides fixed walls on three sides of the pocket 8.

Also, while a single top sheet flap 28, 30, 32 has been illustrated as provided on each side of the pocket opening 13 and a single bottom sheet flap 50 illustrated on the other side of the pocket opening 13, more than one flap may be provided on any side of the pocket opening. 13. Moreover, flaps need not be provided on all sides of the pocket opening 13.

Also, while it has been disclosed that the top sheet 4 and bottom sheet 6 may be bonded together at the peripheral flanges 14, 16 and/or webs 22, 24, that may not be necessary in all embodiments. In some embodiments, it may be sufficient to bond the top and bottom sheet flaps when forming the pockets. This may provide sufficient adhesion between the sheets. It will depend upon the weight of the contents of the pockets 8. Bon ding in this manner may reduce adhesive usage and complexity.

Moreover, although bonding of the top sheet 4 and bottom sheet 6 has been described by way of application of an adhesive to one or both of the sheets, bonding may also be achieved by using a heat seal varnish or cold seal varnish on appropriate parts (or indeed all) of the top sheet 4 and bottom sheet 6.

Figure 8:
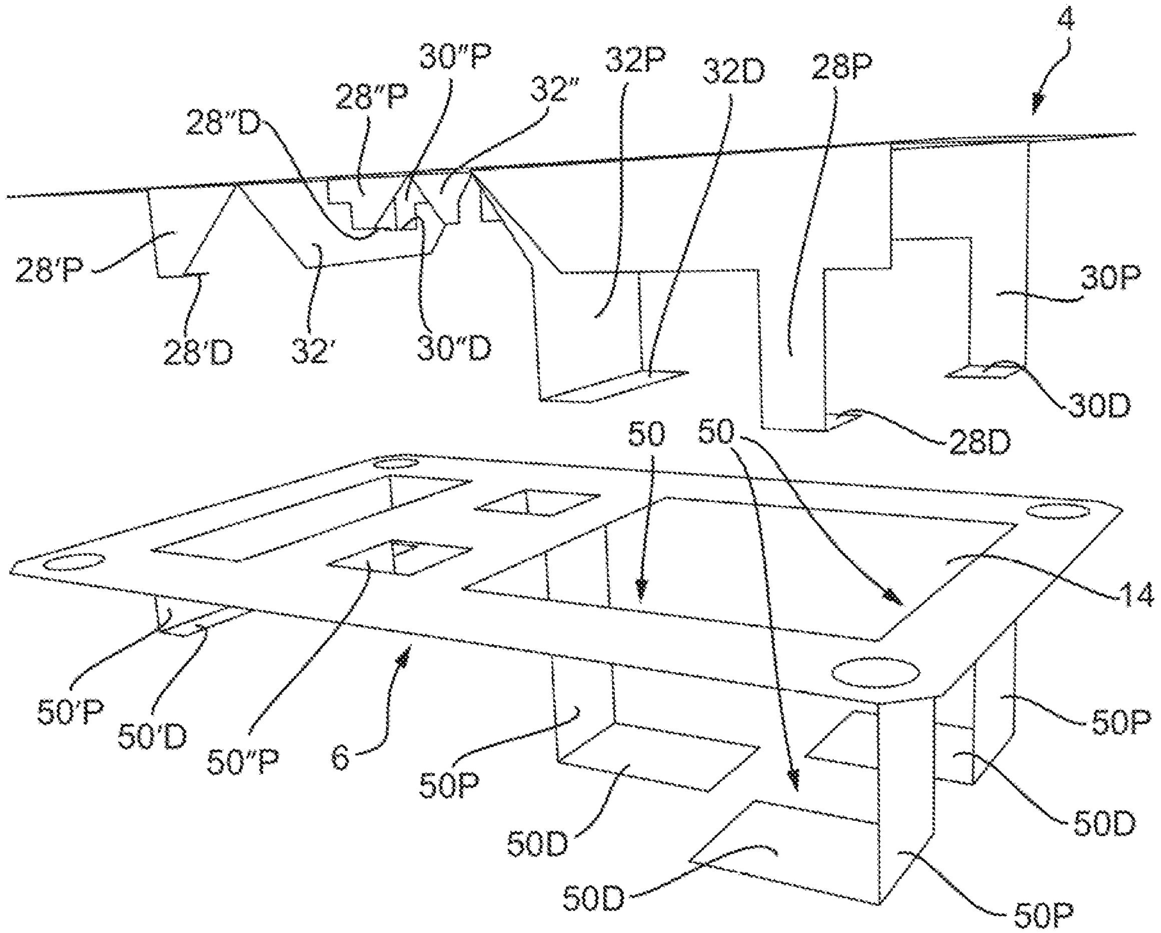
FIG. 8 shows an exploded perspective view of a second tray in accordance with the disclosure.
Figure 9:
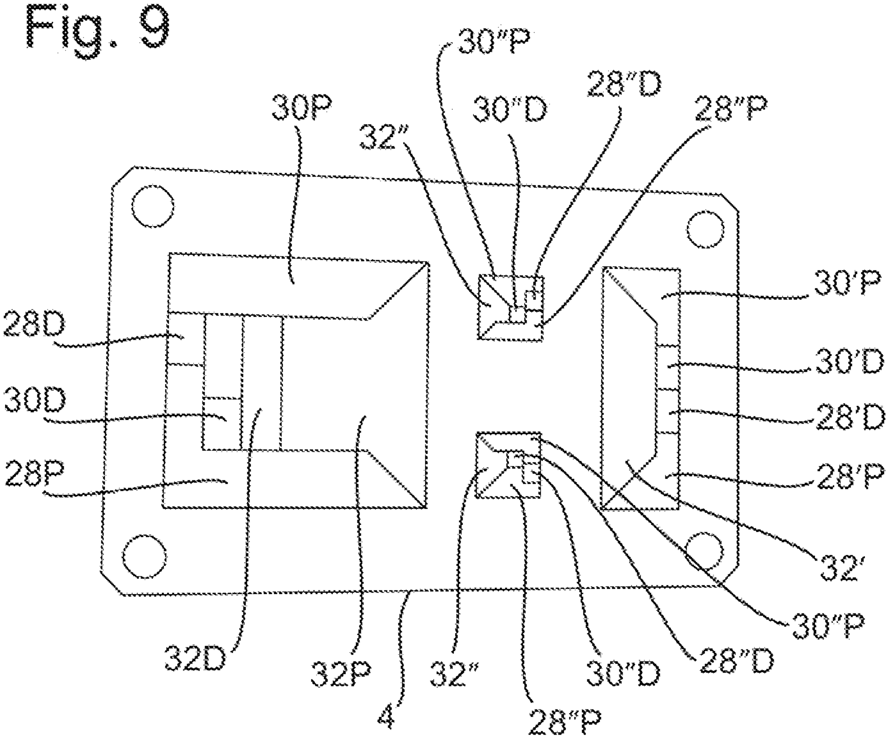
FIG. 9 shows a plan view of the blank of the top sheet of the tray of FIG. 8.
Figure 10:
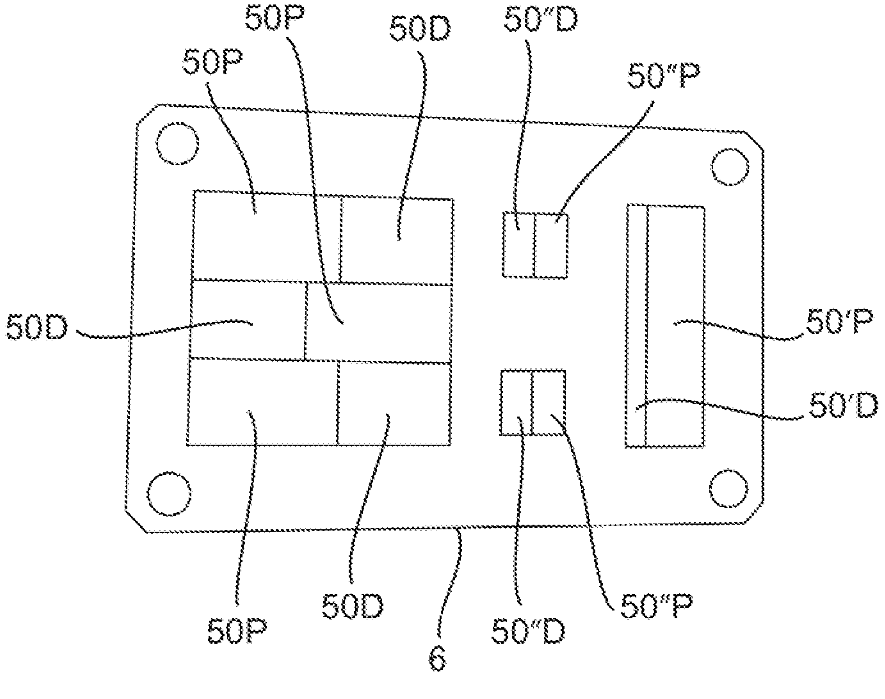
FIG. 10 shows a plan view of the blank of the bottom sheet of the tray of FIG. 8.

A second embodiment of the invention which illustrates some of the above modifications is illustrated in FIGS. 8 to 10.

In this embodiment, the tray 2 comprises first, second and third pockets 8, 8', 8" of different sizes, shapes and depths. As in the earlier embodiment, each pocket 8, 8', 8" is formed by respective sets of top sheet flaps 28, 30, 32, 28', 30', 32', 30", 28", 30", 32" and bottom sheet flaps 50, 50', 50".

In a first pocket 8, first and second top sheet flaps 28, 30 are arranged on opposed sides of the first pocket 8 and a third top sheet flap 32 provided on a third side of the first pocket 8. Two bottom sheet flaps 50 are provided on one side of the first pocket 8 and a third bottom sheet flap 50 is provided on an opposite side of the first pocket 8, between the other two bottom sheet flaps 50.

In this embodiment, in the first pocket 8, top sheet flap distal panels 28D, 30D are adhesively attached to bottom sheet flap distal panels 50D provided on the two bottom sheet flaps 50 arranged on the same side of the pocket 8. The top sheet flap proximal panels 28P, 30P form opposed side walls 66, 68 of the pocket 8, while the two bottom sheet flap proximal panels 50P form a further side wall 70 of the pocket 8. The distal panels 28D, 30D, 50D of the flaps provide a base 64 for the pocket 8.

The third top sheet flap 32 and the third bottom sheet flap 50 may or may not be adhesively bonded to one another, for example at their distal panels 32D, 50D. Even if the third flaps 32, 50 are not bonded together, their proximal panels 32P, 50P will form a wall of the pocket 8 and their distal panels 32D, 50D may provide some support at the base of the pocket 8.

In a second pocket 8', first and second top sheet flaps 28', 30' are provided on opposed sides of the second pocket 8', and a third top sheet flap 32' provided on a side of the second pocket 8' between the opposed sides. The third top sheet flap 32' does not have a distal panel in this pocket 8'.

A single bottom sheet flap 50', which in this embodiment may extend across the entire width of the second pocket 8', is provided on a side of the second pocket 8' between the opposed sides and opposite the side of the second pocket 8' on which is arranged the third top sheet flap 32'. The top sheet flap distal panels 28'D, 30'D of each top sheet flap 28', 30' are adhesively attached to the bottom sheet flap distal panel 50'D of the bottom sheet flap 50'.

The top sheet flap proximal panels 28'P, 30'P form opposed side walls 66', 68' of the pocket 8' and the bottom sheet flap proximal panel 50'P forms a further side wall 70' of the second pocket 8'. The distal panels 28'D, 30'D, 50'D of the flaps provide a base 64' for the second pocket 8'.

The third top sheet flap 32' even though not bonded to the bottom sheet will form a further wall of the second pocket 8' and potentially provide some support for a product in the second pocket 8'.

The second pocket 8' is of a different shape size and depth from the first pocket 8.

A pair of third pockets 8" is provided between the first pocket 8 and the second pocket 8'.

First and second top sheet flaps 28", 30" are provided on opposed sides of each third pocket 8", and a third top sheet flap 32" provided on a side of the third pocket 8" between the opposed sides. The third top sheet flap 32" does not have a distal panel in this pocket 8'.

A single bottom sheet flap 50", which in this embodiment may extend across the entire width of the third pocket 8", is provided on a side of the third pocket 8" between the opposed sides and opposite the side of the third pocket 8" on which is arranged the third top sheet flap 32". The top sheet flap distal panels 28"D, 30"D of each top sheet flap 28", 30" are adhesively attached to the bottom sheet flap distal panel 50"D of the bottom sheet flap 50".

The top sheet flap proximal panels 28"P, 30"P form opposed side walls 66", 68" of the third pocket 8" and the bottom sheet flap proximal panel 50"P forms a further side wall 70" of the third pocket 8". The distal panels 28"D, 30"D, 50"D of the flaps provide a base 64" for the third pocket 8".

The third top sheet flap 32" even though not bonded to the bottom sheet 6 will form a further wall of the third pocket 8" and potentially provide some support for a product in the third pocket 8'2.

The third pockets 8" are of a different shape size and depth from the first pocket 8 and the second pocket 8'.

The other details of the second embodiment are similar to those of the first embodiment and need not therefore be described in detail. The tray of the second embodiment may also be produced by a similar method to that used for the first embodiment.

The particular shape, size and depth of each pocket 8, 8', 8" may be chosen to suit a particular product.

The invention claimed is:

1. A tray made of cardboard, paperboard or other lightweight foldable sheet material and comprising one or more pockets for receiving product, the tray comprising:
   - a top sheet defining one or more top sheet openings for the one or more pockets; and
   - a bottom sheet attached to the top sheet and comprising one or more bottom sheet openings aligned with the top sheet openings;
   - wherein the top sheet comprises one or more respective sets of top sheet flaps, each flap comprising a top sheet flap proximal panel hingedly connected to the top sheet about a respective top sheet flap proximal hinge line defined at the respective top sheet opening, at least one of the top sheet flaps further comprising a top sheet flap distal panel hingedly attached to the respective top sheet flap proximal panel about a respective top sheet flap distal fold line, wherein each top sheet flap is folded about the respective top sheet flap proximal hinge line to extend through the bottom sheet opening such that the top sheet flap proximal panel thereof defines, at least in part, a side wall of the pocket;

the bottom sheet comprising one or more respective sets of bottom sheet flaps, at least one bottom sheet flap comprising a bottom sheet flap proximal portion hingedly attached to the bottom sheet about a respective bottom sheet flap proximal hinge line defined at the respective bottom sheet opening and a bottom sheet flap distal panel hingedly attached to the bottom sheet flap proximal panel about a respective bottom sheet flap distal fold line;

wherein the bottom sheet flap is folded about the respective bottom flap proximal hinge line such that the bottom sheet flap proximal panel defines at least in part a pocket side wall and the bottom sheet flap distal panel defines at least in part a base wall of the pocket; and wherein within each pocket, at least one top sheet flap distal panel is bonded, for example adhesively secured, to the bottom sheet flap distal panel.

2. A tray as claimed in claim 1, wherein the tray comprises a plurality of pockets and respective pockets have different depths from one another.

3. A tray as claimed in claim 1, wherein the top sheet and bottom sheet each comprise a peripheral flange, the top sheet and the bottom sheet being bonded, for example adhesively secured to each other at the peripheral flanges.

4. A tray as claimed in claim 1, wherein the top sheet and bottom sheet each comprise respective webs of material formed between adjacent pockets, one or more of the webs of material of the top sheet being bonded, for example adhesively secured, to one or more of the webs of the bottom sheet.

5. A tray as claimed in claim 1, wherein the proximal panels of the flaps of each set of flaps are angled so as to define a tapering pocket.

6. A tray as claimed in claim 1, wherein the bottom sheet comprises a single bottom sheet flap per set of bottom sheet flaps.

7. A tray as claimed in claim 1, wherein the bottom sheet comprises a plurality of bottom sheet flaps per set of bottom sheet flaps.

8. A tray as claimed in claim 7, wherein a plurality of bottom sheet flaps are provided on one side of the respective bottom sheet opening.

9. A tray as claimed in claim 1, wherein each top sheet flap of the respective set of top sheet flaps comprises a top sheet flap distal panel.

10. A tray as claimed in claim 9, wherein some or each of the top sheet flap distal panels are bonded, for example adhesively secured, to a bottom sheet flap distal panel.

11. A tray as claimed in claim 1, wherein at least one top sheet flap of the respective set of top sheet flaps does not comprise a top sheet flap distal panel.

12. A tray as claimed in claim 1, wherein a single top sheet flap is provided on a respective side of the top sheet opening.

13. A tray as claimed in claim 1, wherein top sheet flaps are provided on opposed sides of the top sheet opening.

14. A tray as claimed in claim 1, wherein a plurality of bottom sheet flaps are provided on the bottom sheet.

15. A tray as claimed in claim 1, wherein the top sheet and bottom sheet comprise aligned location openings.

16. A method of manufacturing the tray as claimed in claim 1 comprising:

placing the bottom sheet on a female forming tool comprising one or more cavities;

moving a bottom sheet male forming tool into the female forming tool so as to fold the bottom sheet flaps into the one or more cavities;

withdrawing the bottom sheet male forming tool from the female forming tool;

placing the top sheet over the folded bottom sheet in alignment therewith;

moving a top sheet male forming tool into the female forming tool so as to fold the top sheet flaps into the one or more cavities and to press the top sheet against the bottom sheet so as to secure the top sheet to the bottom sheet;

withdrawing the top sheet male forming tool from the female forming tool; and removing the tray from the female forming tool.

17. A method as claimed in claim 16, further comprising:

applying adhesive to selected areas of the bottom sheet or of the top sheet prior to bringing the top sheet and bottom sheet into engagement.

18. A method as claimed in claim 17, comprising applying adhesive to selected areas of the folded bottom sheet prior to bringing the top sheet into engagement with the bottom sheet.

* * * * *